(12) United States Patent
Xia et al.

(10) Patent No.: US 12,206,819 B2
(45) Date of Patent: Jan. 21, 2025

(54) METHODS AND APPARATUSES FOR IMPLEMENTING MOBILE TERMINATING CALL

(71) Applicant: Telefonaktiebolaget LM Ericsson (PUBL), Stockholm (SE)

(72) Inventors: Lei Xia, Shanghai (CN); Zhiwei Qu, Shanghai (CN); Ralf Keller, Würselen (DE); Peter Hedman, Helsingborg (SE); Stefan Rommer, Västra Frölunda (SE)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 354 days.

(21) Appl. No.: 17/599,645

(22) PCT Filed: Apr. 8, 2019

(86) PCT No.: PCT/CN2019/081757
§ 371 (c)(1),
(2) Date: Sep. 29, 2021

(87) PCT Pub. No.: WO2020/206590
PCT Pub. Date: Oct. 15, 2020

(65) Prior Publication Data
US 2022/0166878 A1 May 26, 2022

(51) Int. Cl.
*H04W 8/24* (2009.01)
*H04L 65/1016* (2022.01)
(Continued)

(52) U.S. Cl.
CPC ........ *H04M 3/436* (2013.01); *H04L 65/1016* (2013.01); *H04M 1/26* (2013.01);
(Continued)

(58) Field of Classification Search
CPC ............................ H04W 8/24; H04W 28/0215
See application file for complete search history.

(56) References Cited

U.S. PATENT DOCUMENTS

2010/0329244 A1* 12/2010 Buckley .............. H04L 65/1016
370/352
2012/0106324 A1* 5/2012 Keller .................. H04W 60/04
370/225
(Continued)

FOREIGN PATENT DOCUMENTS

CN 108462979 A 8/2018
EP 2 765 823 A2 8/2014
(Continued)

OTHER PUBLICATIONS

3GPP TS 29.272 v15.7.0; Technical Specification; 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15)—Mar. 2019.
(Continued)

*Primary Examiner* — Barry W Taylor
(74) *Attorney, Agent, or Firm* — Weisberg I.P. Law, P.A.

(57) ABSTRACT

Methods and apparatuses are disclosed for implementing mobile terminating call. According to an embodiment, a subscriber management node obtains, from a mobility management node, an indication that indicates whether a packet switching (PS) connection is currently active for a terminal device. The subscriber management node receives, from a server, a first query about whether a PS access domain is to be used for a terminating call to the terminal device. The subscriber management node sends a response to the server based on the obtained indication.

14 Claims, 7 Drawing Sheets

(51) Int. Cl.
  *H04M 1/26*    (2006.01)
  *H04M 3/42*    (2006.01)
  *H04M 3/436*   (2006.01)
  *H04W 28/02*   (2009.01)

(52) U.S. Cl.
  CPC ......... *H04M 3/42348* (2013.01); *H04W 8/24* (2013.01); *H04W 28/0215* (2013.01)

(56) References Cited

U.S. PATENT DOCUMENTS

| | | | | |
|---|---|---|---|---|
| 2012/0327852 | A1* | 12/2012 | Zisimopoulos | H04L 65/1101 370/328 |
| 2013/0329647 | A1* | 12/2013 | Keller | H04W 8/04 370/328 |
| 2014/0307706 | A1 | 10/2014 | Keller et al. | |
| 2015/0011210 | A1* | 1/2015 | Drevon | H04W 60/005 455/435.2 |
| 2015/0056986 | A1* | 2/2015 | Kim | H04L 65/1073 455/432.1 |
| 2016/0080430 | A1 | 3/2016 | Zisimopoulos et al. | |
| 2016/0183175 | A1* | 6/2016 | Keller | H04W 8/24 370/328 |
| 2019/0297121 | A1* | 9/2019 | Qiao | H04L 65/1016 |
| 2020/0153875 | A1* | 5/2020 | Karampatsis | H04L 65/1073 |

FOREIGN PATENT DOCUMENTS

| | | |
|---|---|---|
| EP | 3471465 A1 | 4/2019 |
| WO | 2011000672 A1 | 1/2011 |
| WO | 2014 193942 A1 | 12/2014 |
| WO | 2018 007214 A1 | 1/2018 |

OTHER PUBLICATIONS

PCT International Search Report issued for International application No. PCT/CN2019/081757—Dec. 27, 2019.

PCT Written Opinion of the International Searching Authority issued for International application No. PCT/CN2019/081757—Dec. 27, 2019.

EPO Communication with Supplementary European Search Report dated Sep. 8, 2022 for Patent Application No. 19924434.4, consisting of 11-pages.

\* cited by examiner

METHODS AND APPARATUSES FOR IMPLEMENTING MOBILE TERMINATING CALL

PRIORITY

This nonprovisional application is a U.S. National Stage Filing under 35 U.S.C. § 371 of International Patent Application Serial No. PCT/CN2019/081757 filed Apr. 8, 2019 and entitled "Methods and Apparatuses for Implementing Mobile Terminating Call" which is hereby incorporated by reference in its entirety.

TECHNICAL FIELD

Embodiments of the disclosure generally relate to communication, and, more particularly, to methods and apparatuses for implementing mobile terminating call.

BACKGROUND

This section introduces aspects that may facilitate better understanding of the present disclosure. Accordingly, the statements of this section are to be read in this light and are not to be understood as admissions about what is in the prior art or what is not in the prior art.

In the 4th generation (4G) technology, voice communication is important and there are two solutions to support voice communication. One is circuit switching (CS) fallback and the other is to support Internet protocol (IP) multimedia subsystem (IMS) service over long term evolution (LTE). In IMS service, IMS server may send terminating access domain selection (T-ADS) query for user equipment (UE) IMS registration state to mobility management entity (MME) through home subscriber server (HSS) when receiving voice over LTE (VoLTE) mobile terminating (MT) call. According to the answer of T-ADS query from MME, IMS server will decide whether or not to forward VoLTE MT call to this UE over packet switching (PS).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for implementing mobile terminating call.

According to a first aspect of the disclosure, there is provided a method implemented at a subscriber management node. The method comprises obtaining, from a mobility management node, an indication that indicates whether a packet switching (PS) connection is currently active for a terminal device. The method further comprises receiving, from a server, a first query about whether a PS access domain is to be used for a terminating call to the terminal device. The method further comprises sending a response to the server based on the obtained indication.

In this way, the success rate of mobile terminating call can be improved.

In an embodiment of the disclosure, obtaining the indication comprises one of: receiving a first indication that indicates whether a PS connection is active for the terminal device when the terminal device starts being served by the mobility management node; and receiving a second indication that indicates whether a PS connection is active for the terminal device when a status of the PS connection is changed after the terminal device starts being served by the mobility management node.

In an embodiment of the disclosure, the first indication is received in a request for location update for the terminal device. The second indication is received in a request for information notification for the terminal device.

In an embodiment of the disclosure, the request for location update is an Update Location Request message. The request for information notification is a Notify Request message.

In an embodiment of the disclosure, a Homogeneous-Support-of-IMS-Voice-Over-PS-Sessions information element (IE) is redefined to carry the indication.

In an embodiment of the disclosure, obtaining the indication comprises, in response to receiving the first query, sending, to the mobility management node, a second query about whether a PS access domain is to be used for the terminating call to the terminal device. Obtaining the indication further comprises receiving the indication from the mobility management node.

In an embodiment of the disclosure, the second query is an Insert Subscriber Data Request message. The indication is received in an Insert Subscriber Data Answer message.

In an embodiment of the disclosure, the indication is carried by an IMS-Voice-Over-PS-Sessions-Status IE.

In an embodiment of the disclosure, the server is an application server in IP multimedia subsystem (IMS). The first query is a T-ADS query.

In an embodiment of the disclosure, the subscriber management node is a home subscriber server (HSS) or a unified data management (UDM). The mobility management node is a mobility management entity (MME) or an access and mobility management function (AMF).

According to a second aspect of the disclosure, there is provided a method implemented at a mobility management node. The method comprises detecting a trigger event. The method further comprises, in response to detecting the trigger event, sending, to a subscriber management node, an indication that indicates whether a PS connection is currently active for a terminal device.

In this way, the success rate of mobile terminating call can be improved.

In an embodiment of the disclosure, the trigger event comprises one of: a first event that the terminal device starts being served by the mobility management node; and a second event that a status of the PS connection is changed after the terminal device starts being served by the mobility management node.

In an embodiment of the disclosure, sending the indication comprises one of: in response to detecting the first event, sending a first indication in a request for location update for the terminal device; and in response to detecting the second event, sending a second indication in a request for information notification for the terminal device.

In an embodiment of the disclosure, the request for location update is an Update Location Request message. The request for information notification is a Notify Request message.

In an embodiment of the disclosure, a Homogeneous-Support-of-IMS-Voice-Over-PS-Sessions IE is redefined to carry the indication.

In an embodiment of the disclosure, detecting the trigger event comprises receiving, from the subscriber management node, a query about whether a PS access domain is to be used for a terminating call to the terminal device.

In an embodiment of the disclosure, the query is an Insert Subscriber Data Request message. The indication is sent in an Insert Subscriber Data Answer message.

In an embodiment of the disclosure, the indication is carried by an IMS-Voice-Over-PS-Sessions-Status IE.

In an embodiment of the disclosure, the mobility management node is an MME or an AMF. The subscriber management node is an HSS or a UDM.

According to a third aspect of the disclosure, there is provided a subscriber management node. The subscriber management node comprises at least one processor and at least one memory. The at least one memory contains instructions executable by the at least one processor, whereby the subscriber management node is operative to obtain, from a mobility management node, an indication that indicates whether a PS connection is currently active for a terminal device. The subscriber management node is further operative to receive, from a server, a first query about whether a PS access domain is to be used for a terminating call to the terminal device. The subscriber management node is further operative to send a response to the server based on the obtained indication.

In an embodiment of the disclosure, the subscriber management node is operative to perform the method according to the above first aspect.

According to a fourth aspect of the disclosure, there is provided a mobility management node. The mobility management node comprises at least one processor and at least one memory. The at least one memory contains instructions executable by the at least one processor, whereby the mobility management node is operative to detect a trigger event. The mobility management node is further operative to, in response to detecting the trigger event, send, to a subscriber management node, an indication that indicates whether a PS connection is currently active for a terminal device.

In an embodiment of the disclosure, the mobility management node is operative to perform the method according to the above second aspect.

According to a fifth aspect of the disclosure, there is provided a computer program product. The computer program product comprises instructions which when executed by at least one processor, cause the at least one processor to perform the method according to any of the above first and second aspects.

According to a sixth aspect of the disclosure, there is provided a computer readable storage medium. The computer readable storage medium comprises instructions which when executed by at least one processor, cause the at least one processor to perform the method according to any of the above first and second aspects.

According to a seventh aspect of the disclosure, there is provided a subscriber management node. The subscriber management node comprises an obtaining module for obtaining, from a mobility management node, an indication that indicates whether a PS connection is currently active for a terminal device. The subscriber management node further comprises a reception module for receiving, from a server, a first query about whether a PS access domain is to be used for a terminating call to the terminal device. The subscriber management node further comprises a sending module for sending a response to the server based on the obtained indication.

According to an eighth aspect of the disclosure, there is provided a mobility management node. The mobility management node comprises a detection module for detecting a trigger event. The mobility management node further comprises a sending module for, in response to detecting the trigger event, sending, to a subscriber management node, an indication that indicates whether a PS connection is currently active for a terminal device.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1:
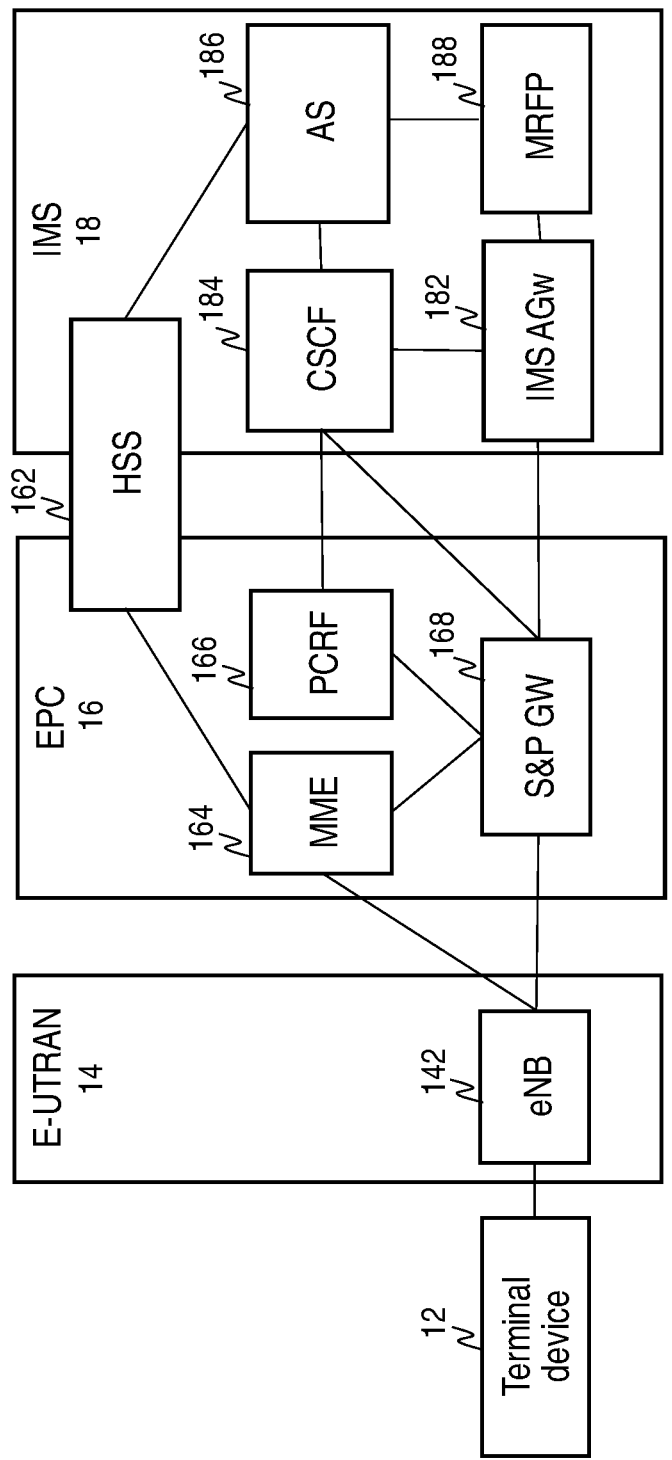
FIG. 1 is a diagram showing an exemplary communication system into which an embodiment of the disclosure is applicable.

For the purpose of explanation, details are set forth in the following description in order to provide a thorough understanding of the embodiments disclosed. It is apparent, however, to those skilled in the art that the embodiments may be implemented without these specific details or with an equivalent arrangement.

In customer network, some mobile devices have different subscriber identification module (SIM) cards and different international mobile subscriber identification number (IMSI) but share the same mobile subscriber ISDN number (MSISDN), e.g. iPhone and iWatch share the same MSISDN. The term ISDN refers to integrated services digital network. Since these devices share the same MSISDN, so when a mobile terminating (MT) voice call is coming, IMS server will, according to the MSISDN, send T-ADS query for IMS registration state to each device. But sometimes the device may not activate the IMS packet data network (PDN) or disable the IMS capability. Thus, it would be desirable for the customer that MME answers the T-ADS query in the following way. If the IMS PDN is activated, MME responds with Insert Subscriber Data Answer whose IE "ims-voice-over-ps-session-supported" is set to "supported" for some devices, and IMS server will select one of them to forward VoLTE MT call. If the IMS PDN is not activated, MME responds with Insert Subscriber Data Answer whose IE "ims-voice-over-ps-session-supported" is set to "not_supported" for all these devices, and IMS server will not select them to forward call.

However, according to 3GPP technical specification (TS) 29.272, this IE "ims-voice-over-ps-session-supported" indicates whether or not "IMS Voice over PS Sessions" is supported by the tracking area (TA)/routing area (RA) that UE has most recently used in the serving SGSN/MME. The term SGSN refers to serving GPRS support node and the term GPRS refers to general packet radio service. The IE is about MME's IMS capability or geographic area's IMS capability and MME sets the IE's value according to local IMS configuration, UE subscription data and UE's single radio voice call continuity (SRVCC) capability, but not to UE's current IMS PDN status. If all the conditions are met except UE has no IMS PDN, MME still fills the IE with "supported". Then IMS server may select this device to forward VoLTE MT call. But UE has no available IMS PDN and thus this MT call will fail.

The present disclosure proposes an improved solution for implementing mobile terminating call. Hereinafter, the solution will be described in detail with reference to FIGS. 1-10.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future.

In the following, different terms may refer to a same or similar network function or network node with the same or similar functionality in different communication systems. For example, HSS and UDM used herein may refer to a network function or node with the same or similar functionality in 4G and 5G respectively. Likewise, MME and AMF used herein may refer to a network function or node with the same or similar functionality in 4G and 5G respectively. Thus, the specific terms used herein do not limit the present disclosure only to the communication system related to the specific terms, which however can be more generally applied to other communication systems.

FIG. 1 is a diagram showing an exemplary communication system into which an embodiment of the disclosure is applicable. As shown, the communication system comprises a terminal device 12, an evolved universal mobile telecommunications system (UMTS) terrestrial radio access network (E-UTRAN) 14, an evolved packet core (EPC) 16 and an IP multimedia subsystems (IMS) 18. Note that the number of each entity shown in FIG. 1 may be more than one.

The terminal device 12 can communicate through a radio access communication link with the E-UTRAN 14. The terminal device may also be referred to as, for example, user equipment (UE), mobile station, mobile unit, subscriber station, access terminal, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The E-UTRAN 14 includes an evolved node B (eNB) 142 which can provide radio access communication links to terminal devices that are within its communication service cell, and can control communications between it and the terminal devices. Note that E-UTRAN is merely an exemplary example for illustration purpose. Alternatively or additionally, there may be other radio access networks (RANs) such as a UTRAN, or a global system for mobile communication (GSM)/enhanced data rate for GSM evolution (EDGE) RAN (GERAN). The UTRAN and the GERAN can each include radio network controller (RNC) nodes to control communications through radio base stations providing radio access communication links to terminal devices that are within their respective communication service cells.

The EPC 16 includes a home subscriber server (HSS) 162, a mobility management entity (MME) 164, a policy and charging rules function (PCRF) 166 and S&P gateway (GW) 168. The HSS 162 can manage subscriber information of the terminal device 12. The MME 164 can carry out mobility management of the terminal device 12. The PCRF 166 can determine a policy and charging control (PCC) rule to be applied to a service data flow of the terminal device 12. The S&P GW 168 refers to serving gateway (SGW) and packet data network (PDN) gateway (PGW). The SGW can transfer user data packets of the terminal device 12 between the E-UTRAN 14 and the PGW. The PGW can serve as a gateway to an external PDN and provide the terminal device 12 with the connectivity to the external PDN.

The IMS 18 includes an IMS access gateway (IMS AGw) 182, a call session control function (CSCF) 184, an application server (AS) 186 and a multimedia resource function processor (MRFP) 188. The IMS AGw 182 is responsible for ensuring that addressing associated with inbound and outbound media streams is correct, which is essentially a network address translation (NAT) function. The CSCF entity 184 may include proxy CSCF (P-CSCF), interrogating CSCF (I-CSCF) and serving CSCF (S-CSCF). The P-CSCF is the entry point to the IMS 18 and can serve as the outbound proxy server for the terminal device 12. The I-CSCF can operate as an inbound session initiation protocol (SIP) proxy server in the IMS 18. The S-CSCF is the main SIP session control node within the IMS 18. The AS 186 can host and execute services. An example of the AS 186 may be an SIP application server for IP telephony and multimedia that enables VoLTE. The MRFP 188 is a media plane node that implements media-related functions.

It should be noted that the HSS 162 and the MME 164 are merely exemplary examples of the components in the communication system and may be replaced by components with similar functionalities. For example, in 5G core (5GC), the HSS may be replaced by a unified data management (UDM) and the MME may be replaced by an access and mobility management function (AMF).

Figure 2:
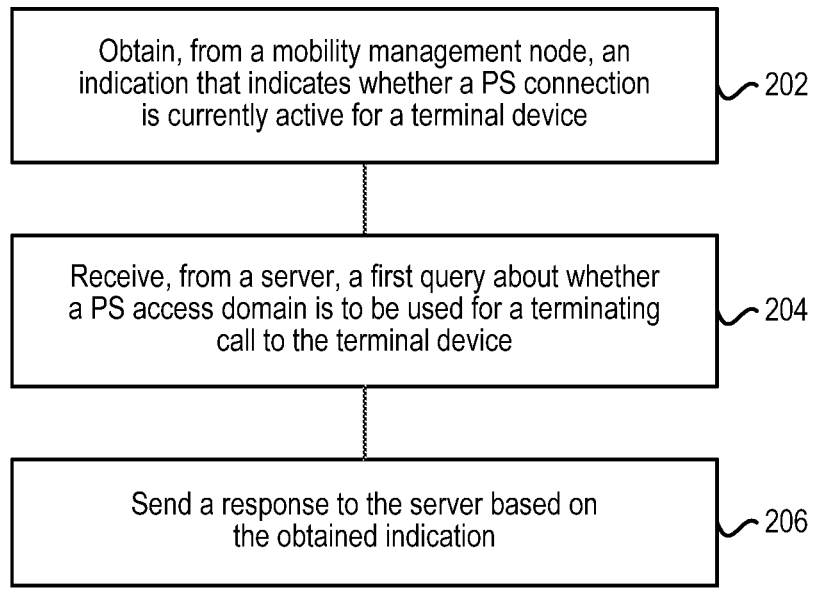
FIG. 2 is a flowchart illustrating a method implemented at a subscriber management node according to an embodiment of the disclosure.

FIG. 2 is a flowchart illustrating a method implemented at a subscriber management node according to an embodiment of the disclosure. The subscriber management node may be an HSS, a UDM, or any other entity having similar functionality. At block 202, the subscriber management node obtains, from a mobility management node, an indication that indicates whether a packet switching (PS) connection is currently active for a terminal device. The mobility management node may be an MME, an AMF, or any other entity having similar functionality. For example, the PS connection may be a PDN connection or a protocol data unit (PDU) session which may be used for IMS. Block 202 may be implemented as block 3021, or block 3022, or blocks 3023-3024, which will be described later.

At block 204, the subscriber management node receives, from a server, a first query about whether a PS access domain is to be used for a terminating call to the terminal device. For example, the server may be an application server in IMS. The first query may be a T-ADS query. At block 206, the subscriber management node sends a response to the server based on the obtained indication. For example, if the indication indicates that there is a PS connection currently active for the terminal device, the response may indicate that a PS access domain is to be used for the terminating call. On the other hand, if the indication indicates that there is no PS connection currently active for the terminal device, the response may indicate that a PS access domain is not to be used for the terminating call. Since the current status of the PS connection is used to answer the first query, the success rate of the mobile terminating call can be improved. Note that if multiple terminal devices share the same MSISDN, a first query may be received and a corresponding response may be sent for each of the multiple terminal devices.

Figure 3A:
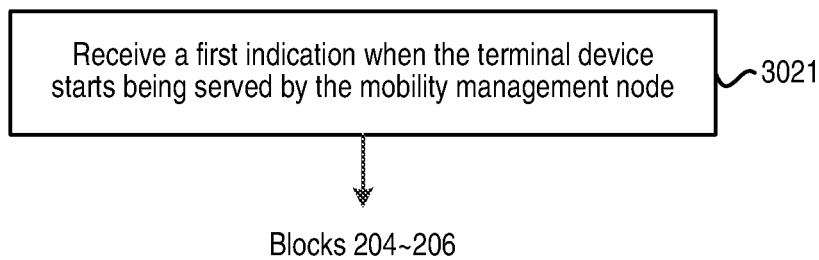
FIGS. 3A-3C are flowcharts each illustrating a method implemented at a subscriber management node according to an embodiment of the disclosure.
Figure 3B:
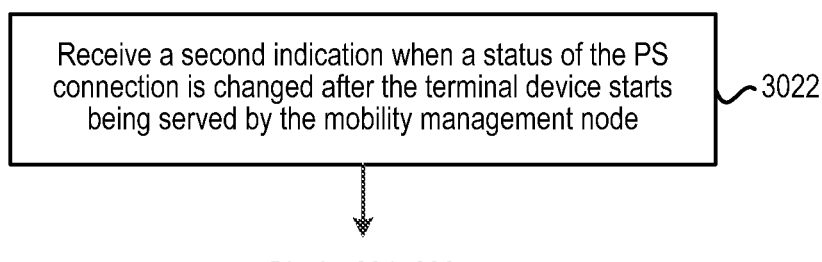
Figure 3C:
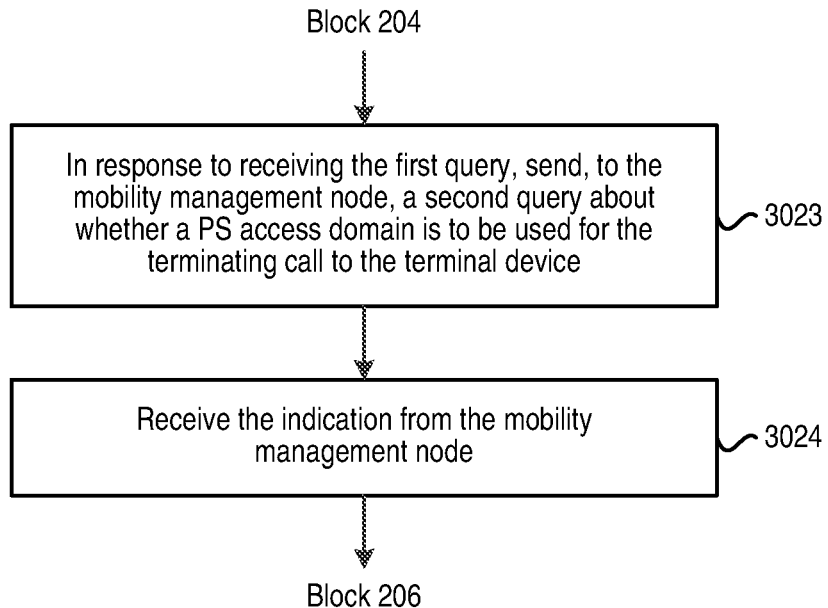

FIGS. 3A-3C are flowcharts each illustrating a method implemented at a subscriber management node according to an embodiment of the disclosure. In the method of FIG. 3A, at block 3021, the subscriber management node receives a first indication that indicates whether a PS connection is active for the terminal device when the terminal device starts being served by the mobility management node. For example, the first indication may be received during attachment, or tracking area update (TAU), or handover of the terminal device towards the mobility management node. The first indication may be received in a request for location update for the terminal device. As an exemplary example, the request for location update may be an Update Location Request message. Then, blocks 204-206 are performed.

In the method of FIG. 3B, at block 3022, the subscriber management node receives a second indication that indicates whether a PS connection is active for the terminal device when a status of the PS connection is changed after the terminal device starts being served by the mobility management node. For example, the second indication may be received in a request for information notification for the terminal device. As an exemplary example, the request for information notification may be a Notify Request message. Then, blocks 204-206 are performed. In the methods of FIGS. 3A and 3B, a Homogeneous-Support-of-IMS-Voice-Over-PS-Sessions information element (IE) may be redefined to carry the indication.

In the method of FIG. 3C, at block 204, the subscriber management node receives, from a server, a first query about whether a PS access domain is to be used for a terminating call to the terminal device. At block 3023, in response to receiving the first query, the subscriber management node sends, to the mobility management node, a second query about whether a PS access domain is to be used for the terminating call to the terminal device. As an exemplary example, the second query may be an Insert Subscriber Data Request message which may define the query type as T-ADS. At block 3024, the subscriber management node receives the indication from the mobility management node. As an exemplary example, the indication may be received in an Insert Subscriber Data Answer message. In the method of FIG. 3C, the indication may be carried by an IMS-Voice-Over-PS-Sessions-Status IE.

Figure 4:
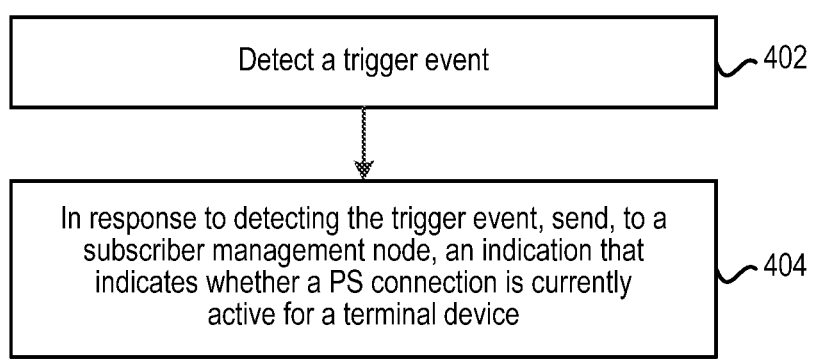
FIG. 4 is a flowchart illustrating a method implemented at a mobility management node according to an embodiment of the disclosure.

FIG. 4 is a flowchart illustrating a method implemented at a mobility management node according to an embodiment of the disclosure. At block 402, the mobility management node detects a trigger event. For example, block 402 may be implemented as block 5021, or block 5022 or block 5023, which will be described later. At block 404, in response to detecting the trigger event, the mobility management node sends, to a subscriber management node, an indication that indicates whether a PS connection is currently active for a terminal device. For example, block 404 may be implemented as block 5041, or block 5042 or block 5043, which will be described later.

Figure 5A:
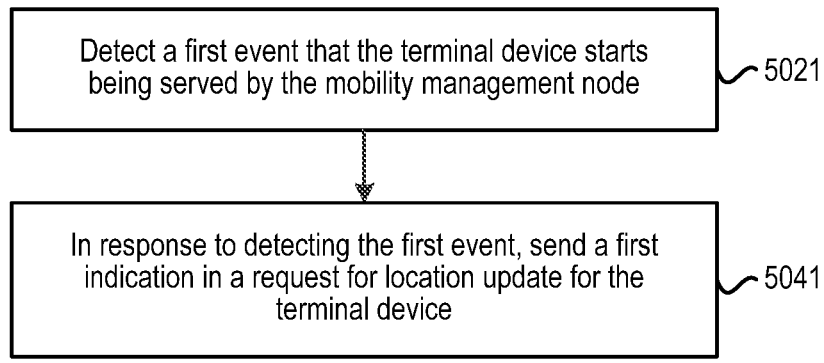
FIGS. 5A-5C are flowcharts each illustrating a method implemented at a mobility management node according to an embodiment of the disclosure.
Figure 5B:
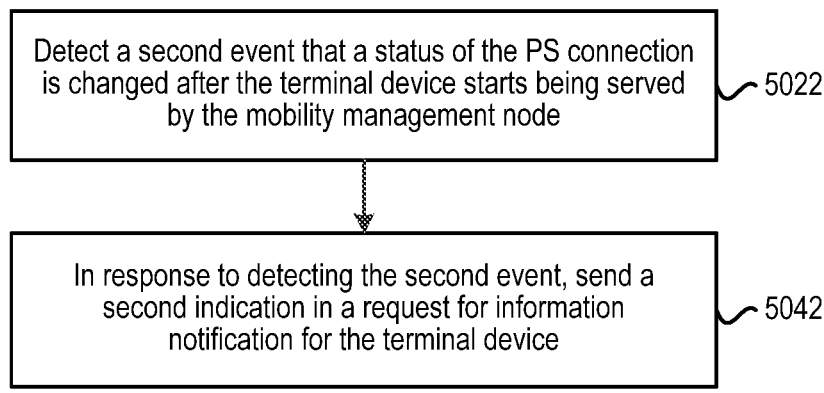
Figure 5C:
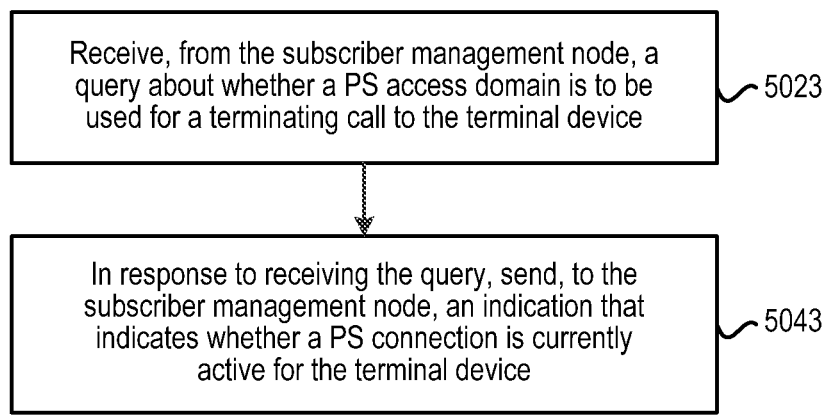

FIGS. 5A-5C are flowcharts each illustrating a method implemented at a mobility management node according to an embodiment of the disclosure. In the method of FIG. 5A, at block 5021, the mobility management node detects a first event that the terminal device starts being served by the mobility management node. For example, the first event may be detected when an attachment, or TAU, or handover procedure is initiated. At block 5041, in response to detecting the first event, the mobility management node sends a first indication in a request for location update for the terminal device. As an exemplary example, the request for location update may be an Update Location Request message.

In the method of FIG. 5B, at block 5022, the mobility management node detects a second event that a status of the PS connection is changed after the terminal device starts being served by the mobility management node. For example, the second event may be detected once the status of the PS connection is changed after the attachment, or TAU, or handover procedure. At block 5042, in response to detecting the second event, the mobility management node sends a second indication in a request for information notification for the terminal device. As an exemplary example, the request for information notification may be a Notify Request message. In the methods of FIGS. 5A and 5B, a Homogeneous-Support-of-IMS-Voice-Over-PS-Sessions IE may be redefined to carry the indication.

In the method of FIG. 5C, at block 5023, the mobility management node receives, from the subscriber management node, a query about whether a PS access domain is to be used for a terminating call to the terminal device. As an exemplary example, the query may be an Insert Subscriber Data Request message which may define the query type as T-ADS. At block 5043, in response to receiving the query, the mobility management node sends, to the subscriber management node, an indication that indicates whether a PS connection is currently active for the terminal device. As an exemplary example, the indication may be sent in an Insert Subscriber Data Answer message. In the method of FIG. 5C, the indication may be carried by an IMS-Voice-Over-PS-Sessions-Status IE.

Figure 6:
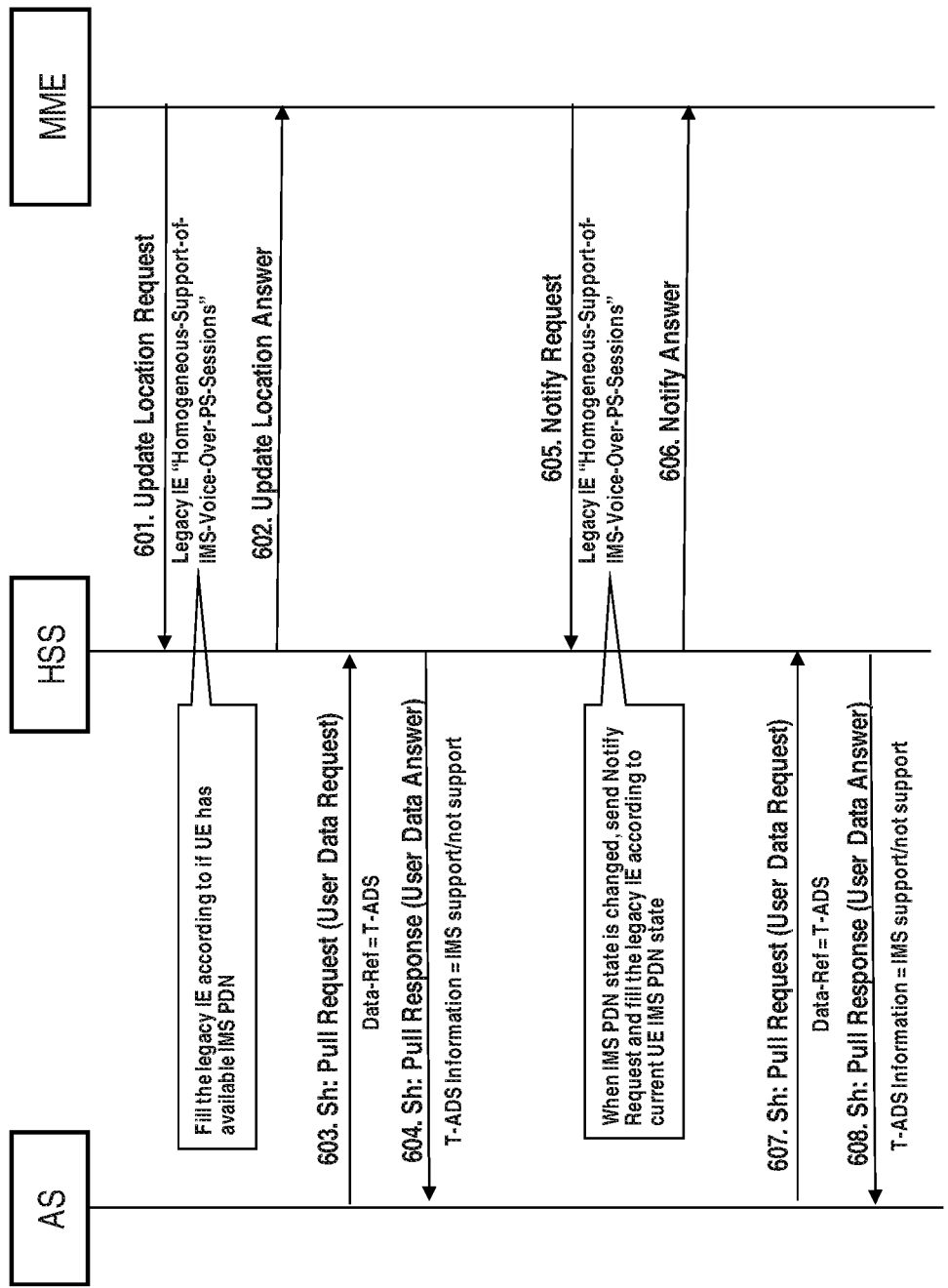
FIG. 6 is a flowchart illustrating an exemplary process according to an embodiment of the disclosure.

FIG. 6 is a flowchart illustrating an exemplary process according to an embodiment of the disclosure. As shown, the exemplary process involves three entities, i.e. an AS, an HSS and an MME. In this process, a legacy IE "Homogeneous-Support-of-IMS-Voice-Over-PS-Sessions" is reused to indicate whether the IMS PDN status is ACTIVE or INACTIVE. The MME includes this IE in Update Locate Request or Notify Request to tell the HSS about the IMS PDN status once there is any change of this IMS PDN status. In this way, the MME actively initiates a notification to the HSS about the UE's IMS PDN status so as to avoid MT VoLTE call failure.

At block 601, the MME sends an Update Location Request to the HSS during an attachment, TAU, or handover procedure. Block 601 may be performed based on an operator policy. The MME fills the legacy IE "Homogeneous-Support-of-IMS-Voice-Over-PS-Sessions" with "supported" if the UE has IMS PDN activated and if the MME has determined that Voice over PS is supported for this UE in the TA list (see 3GPP TS 29.272, section 7.3.107). On the other hand, the MME may fill the IE with "not_supported" if the UE does not have an on-going IMS PDN connection, e.g. if the IMS APN is not the default APN in the subscription. At block 602, the HSS replies to the MME with an Update Location Answer.

At block 603, the AS sends a T-ADS query to the HSS. The T-ADS query takes the form of a user data request which is a pull request whose Data-Ref is set to T-ADS. The term "Ref" refers to Reference and the term "Sh" shown in FIG. 6 refers to the interface between the AS and the HSS. At block 604, the HSS answers the T-ADS query from the AS (an IMS server) directly without asking the MME. If the IE's value is "supported", the HSS may respond the T-ADS query from the AS with UE supporting IMS service. Then, the AS will forward VoLTE MT call to the UE. If the IE's value is "not_supported", the HSS may respond with UE not supporting IMS service. Then, the AS will not forward VoLTE MT call to the UE.

Suppose the UE's IMS PDN status is changed, e.g. the on-going IMS PDN is disconnected or an IMS PDN is setup for the UE which has no IMS PDN before. Then, at block 605, the MME sends to the HSS a Notify Request with IE "Homogeneous-Support-of-IMS-Voice-Over-PS-Sessions" whose value represents the current UE IMS PDN status to update IMS information in the HSS side. At block 606, the HSS replies to the MME with a Notify Answer. At block 607, the AS sends a T-ADS query to the HSS. At block 608, the HSS answers the T-ADS query from the AS correctly according to the latest IMS PDN status. Then, the AS can make the right choice. For a group of UEs sharing the same MSISDN, the VoLTE MT call can be forwarded to the right UE which has IMS PDN and thus can be successfully set up. Other UEs which have no IMS PDN will not receive VoLTE MT call.

It should be noted that in 5G system (5GS), the PDU session to the IMS data network name (DNN) is established by the UE separately from the Registration procedure. Hence, after the registration procedure has been completed, similar procedure may be considered, which is about an AMF updating a UDM with the UE's "Homogeneous-Support-of-IMS-Voice-Over-PS-Sessions" considering whether an IMS PDU session has been established.

Figure 7:
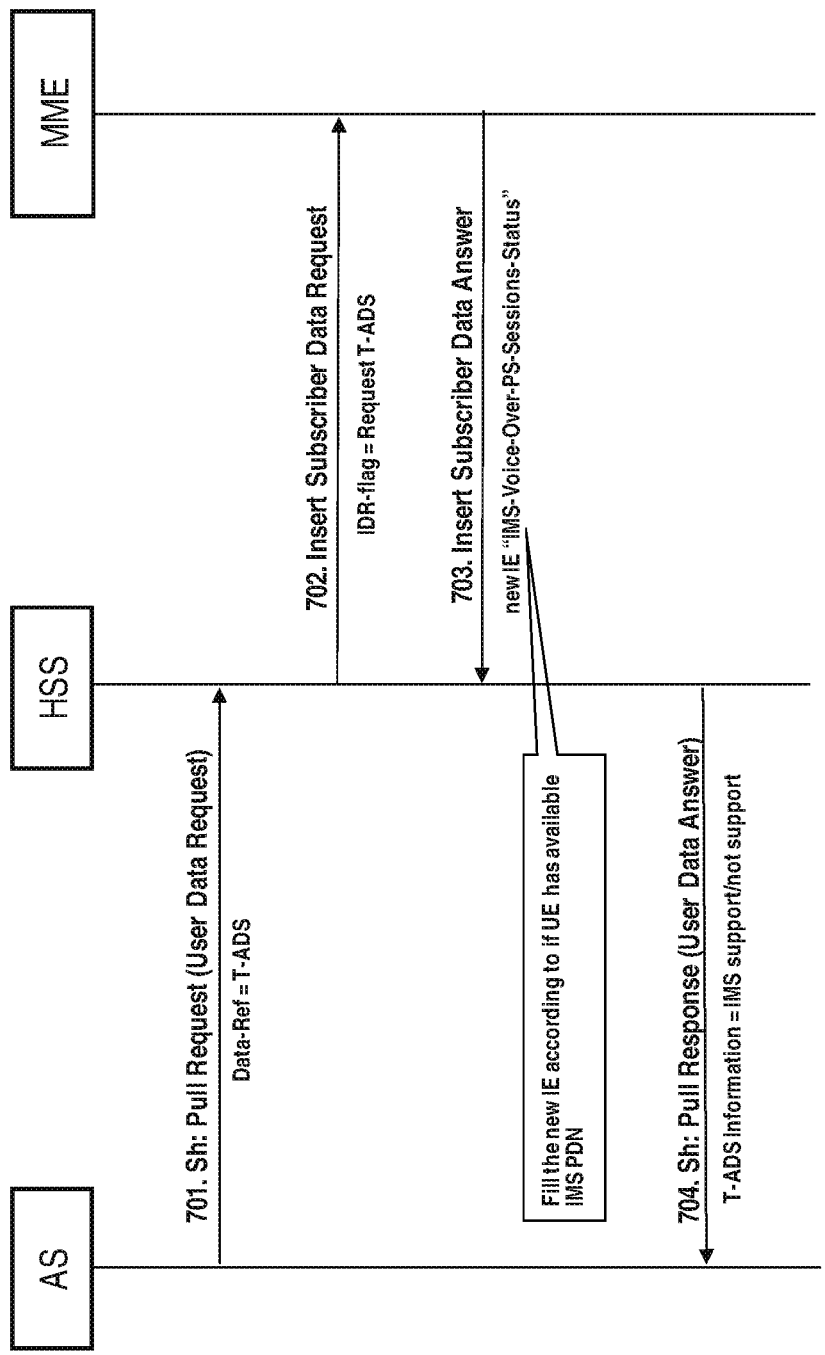
FIG. 7 is a flowchart illustrating an exemplary process according to another embodiment of the disclosure.

FIG. 7 is a flowchart illustrating an exemplary process according to another embodiment of the disclosure. Similar to FIG. 6, this process also involves three entities, i.e. an AS, an HSS and an MME. In this process, a new IE is introduced to indicate whether the IMS PDN status is ACTIVE or INACTIVE. In the T-ADS query process, the MME includes this IE to tell the HSS about the IMS PDN status. In this way, the MME responds T-ADS query with the UE's IMS PDN status so as to avoid MT VoLTE call failure. At block 701, the AS sends a T-ADS query (an IMS registration state query) to the HSS. The T-ADS query takes the form of a user data request which is a pull request whose Data-Ref is set to T-ADS. At block 702, the HSS sends an Insert Subscriber Data Request to the MME. The insert subscriber data request (IDR) flag is set to "T-ADS Data Request" for T-ADS querying about the UE's IMS status. At block 703, the MME sends an Insert Subscriber Data Answer to the HSS. The MME may fill the new IE "IMS-Voice-Over-PS-Sessions-Status" with value "ACTIVE" or "INACTIVE" in the Insert Subscriber Data Answer according to the UE's current IMS PDN status. At block 704, the HSS answers the T-ADS query with a user data answer which is a pull response.

After the HSS forwards the T-ADS answer to the AS, the AS can decide whether or not to forward the VoLTE MT call to this UE according to this IE's value. If it is ACTIVE, then the AS can forward the MT call to the UE. If it is INACTIVE, then the AS will not forward the MT call to the UE. For a group of UEs sharing the same MSISDN, the VoLTE MT call can be forwarded to the right UE which has IMS PDN and thus can be successfully set up. Other UEs which have no IMS PDN will not receive VoLTE MT call. Thus, according to the processes shown in FIGS. 6 and 7, efficient ways can be provided to improve VoLTE MT call successful rate. It should be noted that two blocks shown in succession in the figures may, in fact, be executed substantially concurrently, or the blocks may sometimes be executed in the reverse order, depending upon the functionality involved.

According to the process shown in FIG. 7, changes may be made to Table 5.2.2.1.1/2 (Insert Subscriber Data Answer) of 3GPP TS 29.272 (with the changes being underlined) as shown below.

| Information element name | Mapping to Diameter AVP | Cat. | Description |
| --- | --- | --- | --- |
| Supported Features (See 3GPP TS 29.229 [9]) | Supported-Features | O | If present, this information element shall contain the list of features supported by the origin host. |
| Result (See 7.4) | Result-Code/ Experimental-Result | M | This IE shall contain the result of the operation. Result-Code AVP shall be used to indicate success/errors defined in the Diameter base protocol (see IETF RFC 6733 [61]). The Experimental-Result AVP shall be used for S6a/S6d errors. This is a grouped AVP which shall contain the 3GPP Vendor ID in the Vendor-Id AVP, and the error code in the Experimental-Result-Code AVP. The following errors are applicable in this case: User Unknown |

-continued

| Information element name | Mapping to Diameter AVP | Cat. | Description |
|---|---|---|---|
| IMS Voice over PS Sessions Supported (See 7.3.106) | IMS-Voice-Over-PS-Sessions-Supported | C | If available to the serving node, this information element shall indicate whether or not "IMS Voice over PS Sessions" is supported by the UE's most recently used TA or RA in the serving node (MME or SGSN or combined MME/SGSN). If the UE is in detached state, this information element shall not be included in the response. |
| Last UE Activity Time (See 7.3.108) | Last-UE-Activity-Time | C | If available to the serving node, this information element shall contain the time of the last radio contact with the UE. If the UE is in detached state, this information element shall not be included in the response. |
| RAT Type (See 7.3.13) | RAT-Type | C | If available to the serving node, this information element shall indicate the RAT Type of the access where the UE was present at the time of the last radio contact. If the UE is in detached state, this information element shall not be included in the response. |
| IDA-Flags (See 7.3.47) | IDA-Flags | C | This Information Element shall contain a bit mask. See 7.3.47 for the meaning of the bits. |
| EPS-User-State (See 7.3.110) | EPS-User-State | C | This Information Element shall contain the EPS-User State. It shall be present if EPS user state was requested within IDR. |
| EPS-Location-Information (See 7.3.111) | EPS-Location-Information | C | This Information Element shall contain the EPS-Location Information. It shall be present if EPS location information was requested within IDR. |
| Local Time Zone (See 7.3.156) | Local-Time-Zone | C | This Information Element shall contain information on the Local Time Zone of the location in the visited network where the UE is attached. It shall be present if the Local Time Zone was requested within IDR. |
| Monitoring Event Report | Monitoring-Event-Report | C | This Information Element shall contain the report of Monitoring event. It shall be present if Monitoring event configuration is included within IDR and any of the requested Monitoring events are available to be reported. |
| Monitoring Event Config Status | Monitoring-Event-Config-Status | C | This Information Element shall be present if Monitoring event configuration is included in IDR. It shall contain all the configuration status for each Monitoring event that was requested. |
| Supported Services (3GPP TS 29.336 [54]) | Supported-Services | O | If present, this Information Element shall contain AVPs indicating details of the services supported by the MME/SGSN. |
| IMS Voice over PS Sessions Status | IMS-Voice-Over-PS-Sessions-Status | C | If available to the serving node, this information element shall indicate whether or not UE has available IMS PDN in the serving node (MME or SGSN or combined MME/SGSN). If the UE is in detached state, this information element shall not be included in the response. |

The following content may be added into 3GPP TS 29.272:

7.3.X IMS-Voice-Over-PS-Sessions-Status

The IMS-Voice-Over-PS-Sessions-Status AVP is of type Enumerated. The following values are defined:

INACTIVE (0)
This value indicates that "IMS Voice over PS Sessions" of UE is INACTIVE currently in the serving node.
ACTIVE (1)
This value indicates that "IMS Voice over PS Sessions" of UE is ACTIVE currently in the serving node.

Figure 8:
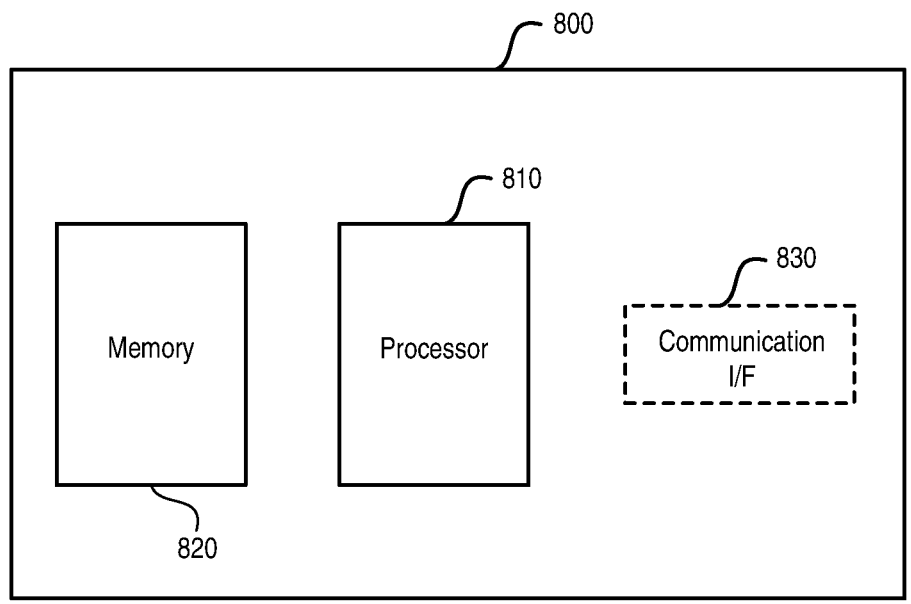
FIG. 8 is a block diagram showing an apparatus suitable for use in practicing some embodiments of the disclosure.

FIG. 8 is a block diagram showing an apparatus suitable for use in practicing some embodiments of the disclosure. For example, any one of the subscriber management node and the mobility management node described above may be implemented through the apparatus 800. As shown, the apparatus 800 may include a processor 810, a memory 820 that stores a program, and optionally a communication interface 830 for communicating data with other external devices through wired and/or wireless communication.

The program includes program instructions that, when executed by the processor 810, enable the apparatus 800 to operate in accordance with the embodiments of the present disclosure, as discussed above. That is, the embodiments of the present disclosure may be implemented at least in part by computer software executable by the processor 810, or by hardware, or by a combination of software and hardware.

The memory 820 may be of any type suitable to the local technical environment and may be implemented using any suitable data storage technology, such as semiconductor based memory devices, flash memories, magnetic memory devices and systems, optical memory devices and systems, fixed memories and removable memories. The processor 810 may be of any type suitable to the local technical environment, and may include one or more of general purpose computers, special purpose computers, microprocessors, digital signal processors (DSPs) and processors based on multi-core processor architectures, as non-limiting examples.

Figure 9:
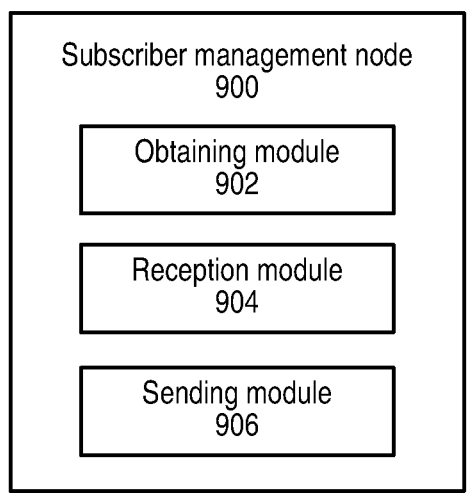
FIG. 9 is a block diagram showing a subscriber management node according to an embodiment of the disclosure.

FIG. 9 is a block diagram showing a subscriber management node according to an embodiment of the disclosure. As shown, the subscriber management node 900 comprises an obtaining module 902, a reception module 904 and a sending module 906. The obtaining module 902 may be configured to obtain, from a mobility management node, an indication that indicates whether a PS connection is currently active for a terminal device, as described above with respect to block 202. The reception module 904 may be configured to receive, from a server, a first query about whether a PS access domain is to be used for a terminating call to the terminal device, as described above with respect to block 204. The sending module 906 may be configured to send a response to the server based on the obtained indication, as described above with respect to block 206.

Figure 10:
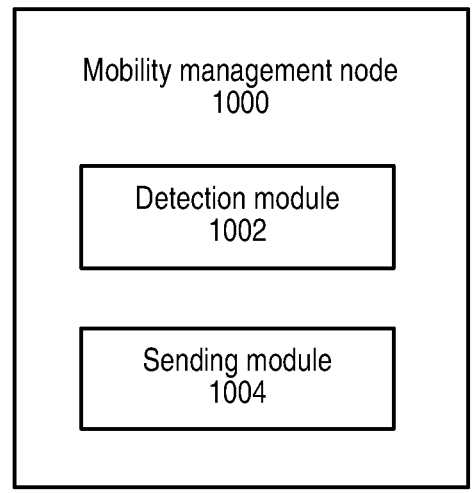
FIG. 10 is a block diagram showing a mobility management node according to an embodiment of the disclosure.

FIG. 10 is a block diagram showing a mobility management node according to an embodiment of the disclosure. As shown, the mobility management node 1000 comprises a detection module 1002 and a sending module 1004. The detection module 1002 may be configured to detect a trigger event, as described above with respect to block 402. The sending module 1004 may be configured to, in response to detecting the trigger event, send, to a subscriber management node, an indication that indicates whether a PS connection is currently active for a terminal device, as described above with respect to block 404. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method in a subscriber management node, the subscriber management node being a unified data management, UDM, node, the method comprising:
    obtaining, from a mobility management node, an indication that indicates whether a packet switching, PS, connection is currently active for a terminal device, the mobility management node being an access and mobility management function, AMF;
    receiving, from a server, a first query about whether a PS access domain is to be used for a terminating call to the terminal device, the server being an application server in an Internet protocol, IP, multimedia subsystem, IMS, and the first query being a terminating access domain selection, T-ADS, query;
    sending a response to the server based on the obtained indication;
    obtaining the indication comprises one of:
        receiving a first indication that indicates whether a PS connection is active for the terminal device by indicating that a status of the PS connection is active or that the status of the PS connection is inactive when the terminal device starts being served by the mobility management node; and receiving a second indication that indicates whether the PS connection is active for the terminal device by indicating that the status of the PS connection is active or that the status of the PS connection is inactive, when the status of the PS connection is changed after the terminal device starts being served by the mobility management node; and a Homogeneous-Support-of-IMS-Voice-Over-PS-Sessions information element, IE, being redefined to carry the indication.

2. The method according to claim 1, wherein the first indication is received in a request for location update for the terminal device; and wherein the second indication is received in a request for information notification for the terminal device.

3. The method according to claim 2, wherein the request for location update is an Update Location Request message; and wherein the request for information notification is a Notify Request message.

4. The method according to claim 1, wherein obtaining the indication comprises:

in response to receiving the first query, sending, to the mobility management node, a second query about whether a PS access domain is to be used for the terminating call to the terminal device; and receiving the indication from the mobility management node.

5. The method according to claim 4, wherein the second query is an Insert Subscriber Data Request message; and wherein the indication is received in an Insert Subscriber Data Answer message.

6. The method according to claim 4, wherein the indication is carried by an IMS-Voice-Over-PS-Sessions-Status IE.

7. A method in a mobility management node, the mobility management node being an access and mobility management function, AMF, the method comprising:

detecting a trigger event;

in response to detecting the trigger event, sending, to a subscriber management node, an indication that indicates whether a packet switching, PS, connection is currently active for a terminal device by indicating that a status of the PS connection is active or that the status of the PS connection is inactive, the subscriber management node being a unified data management, UDM, node;

the trigger event comprises one of:

a first event that the terminal device starts being served by the mobility management node; and a second event that the status of the PS connection is changed after the terminal device starts being served by the mobility management node; and a Homogeneous-Support-of-IMS-Voice-Over-PS-Sessions information element, IE, is redefined to carry the indication.

8. The method according to claim 7, wherein sending the indication comprises one of:

in response to detecting the first event, sending a first indication in a request for location update for the terminal device; and in response to detecting the second event, sending a second indication in a request for information notification for the terminal device.

9. The method according to claim 8, wherein the request for location update is an Update Location Request message; and wherein the request for information notification is a Notify Request message.

10. The method according to claim 7, wherein detecting the trigger event comprises:

receiving, from the subscriber management node, a query about whether a PS access domain is to be used for a terminating call to the terminal device.

11. The method according to claim 10, wherein the query is an Insert Subscriber Data Request message; and wherein the indication is sent in an Insert Subscriber Data Answer message.

12. The method according to claim 10, wherein the indication is carried by an IMS-Voice-Over-PS-Sessions-Status IE.

13. A subscriber management node, the subscriber management node being a unified data management, UDM, node, the subscriber management node comprising:

at least one processor; and at least one memory, the at least one memory containing instructions executable by the at least one processor, whereby the subscriber management node is operative to:

obtain, from a mobility management node, an indication that indicates whether a packet switching, PS, connection is currently active for a terminal device, the mobility management node being an access and mobility management function, AMF;

receive, from a server, a first query about whether a PS access domain is to be used for a terminating call to the terminal device, the server being an application server in an Internet protocol, IP, multimedia subsystem, IMS, and the first query being a terminating access domain selection, T-ADS, query; and send a response to the server based on the obtained indication;

obtaining the indication comprises one of:

receiving a first indication that indicates whether a PS connection is active for the terminal device by indicating that a status of the PS connection is active or that the status of the PS connection is inactive when the terminal device starts being served by the mobility management node; and receiving a second indication that indicates whether the PS connection is active for the terminal device by indicating that the status of the PS connection is active or that the status of the PS connection is inactive when the status of the PS connection is changed after the terminal device starts being served by the mobility management node; and a Homogeneous-Support-of-IMS-Voice-Over-PS-Sessions information element, IE, being redefined to carry the indication.

14. A mobility management node, the mobility management node being an access and mobility management function, AMF, the mobility management node comprising:

at least one processor; and at least one memory, the at least one memory containing instructions executable by the at least one processor, whereby the mobility management node is operative to:

detect a trigger event; and in response to detecting the trigger event, send, to a subscriber management node, an indication that indicates whether a packet switching, PS, connection is currently active for a terminal device by indicating that a status of the PS connection is active or that the status of the PS connection is inactive, the subscriber management node being a unified data management, UDM, node;
the trigger event comprising one of:
  a first event that the terminal device starts being served by the mobility management node; and
  a second event that a status of the PS connection is changed after the terminal device starts being served by the mobility management node; and
a Homogeneous-Support-of-IMS-Voice-Over-PS-Sessions information element, IE, is redefined to carry the indication.

* * * * *